(12) United States Patent
Sasa

(10) Patent No.: US 11,060,856 B2
(45) Date of Patent: Jul. 13, 2021

(54) MISALIGNMENT DETECTION DEVICE AND MISALIGNMENT DETECTION METHOD

(71) Applicant: SCREEN HOLDINGS CO., LTD., Kyoto (JP)

(72) Inventor: Yasushi Sasa, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 0 days.

(21) Appl. No.: 16/963,050

(22) PCT Filed: Dec. 21, 2018

(86) PCT No.: PCT/JP2018/047289
§ 371 (c)(1),
(2) Date: Jul. 17, 2020

(87) PCT Pub. No.: WO2019/167401
PCT Pub. Date: Sep. 6, 2019

(65) Prior Publication Data
US 2020/0348128 A1 Nov. 5, 2020

(30) Foreign Application Priority Data
Feb. 27, 2018 (JP) .............................. JP2018-033372

(51) Int. Cl.
*G01B 11/27* (2006.01)
*G01N 21/95* (2006.01)
(Continued)

(52) U.S. Cl.
CPC ............ *G01B 11/27* (2013.01); *G01B 11/272* (2013.01); *G01N 21/95* (2013.01);
(Continued)

(58) Field of Classification Search
CPC ....... G01B 11/26; G01B 11/27; G01B 11/272; G01N 21/88; G01N 21/8803;
(Continued)

(56) References Cited

U.S. PATENT DOCUMENTS 8,826,718 B2 * 9/2014 Kanamori ............ G01D 5/3473
73/1.75
9,824,908 B2 * 11/2017 Yoshida ................. B25J 9/1664
(Continued)

FOREIGN PATENT DOCUMENTS

| JP | 55-067604 A | 5/1980 |
| JP | 2002-280440 A | 9/2002 |

(Continued)

OTHER PUBLICATIONS

International Search Report issued in corresponding International Patent Application No. PCT/JP2018/047289, dated Mar. 19, 2019, with English translation.
(Continued)

*Primary Examiner* — Gordon J Stock, Jr.
(74) *Attorney, Agent, or Firm* — McDermott Will & Emery LLP

(57) ABSTRACT

A device includes a storage 52 for storing a reference pattern corresponding to a part of a workpiece outer peripheral part, an imager 27 for imaging the outer peripheral part at least for one turn of a workpiece by such imaging at a fixed point as to include at least a part of the outer peripheral part in an imaging field of view, an image processor 55 for detecting a region corresponding to the reference pattern by performing a pattern matching process, and a misalignment detector 51 for detecting the misalignment based on information on a position of each of a plurality of the detected regions. The reference pattern corresponds in shape to a plurality of characteristic parts that present on the outer peripheral part,
(Continued)

have shapes congruent to each other and have a mutually symmetrical positional relationship with respect to rotation about the center axis.

8 Claims, 12 Drawing Sheets

(51) Int. Cl.
| | | |
|---|---|---|
| *G01N 21/956* | (2006.01) | |
| *G06T 7/33* | (2017.01) | |
| *G06T 7/73* | (2017.01) | |
| *G06T 7/68* | (2017.01) | |
| *G06T 7/00* | (2017.01) | |
| *G01N 21/88* | (2006.01) | |

(52) U.S. Cl.
CPC ... *G01N 21/9515* (2013.01); *G01N 21/95607* (2013.01); *G06T 7/001* (2013.01); *G06T 7/337* (2017.01); *G06T 7/68* (2017.01); *G06T 7/74* (2017.01); *G01N 2021/8887* (2013.01)

(58) Field of Classification Search
CPC ........... G01N 21/8806; G01N 21/8851; G01N 21/95; G01N 21/9501; G01N 21/9515; G01N 21/952; G01N 21/956; G01N 21/95607; G01N 21/95684; G01N 2021/8861; G01N 2021/8864; G01N 2021/8867; G01N 2021/887; G01N 2021/8887; G01N 2021/8896; G01N 2021/95615; G06T 7/0002; G06T 7/0004; G06T 7/001; G06T 7/30; G06T 7/33; G06T 7/337; G06T 7/344; G06T 7/38; G06T 7/60; G06T 7/66; G06T 7/68; G06T 7/70; G06T 7/73; G06T 7/97; G06T 7/10; G06T 7/11; G06T 7/12; G06T 7/13; G06T 7/174; H01L 21/67259; H01L 21/68; H01L 21/681
See application file for complete search history.

(56) References Cited

U.S. PATENT DOCUMENTS

| | | | |
|---|---|---|---|
| 9,952,038 B2* | 4/2018 | Kanto | G01B 11/2518 |
| 10,043,276 B2* | 8/2018 | Otake | G06T 7/73 |
| 10,417,533 B2* | 9/2019 | Barker | G06K 9/4604 |
| 10,495,581 B2* | 12/2019 | Onishi | G01N 21/8851 |
| 10,613,037 B2* | 4/2020 | Nagata | G01N 21/956 |
| 10,658,219 B2* | 5/2020 | Nishimura | G01M 11/0207 |
| 10,690,490 B2* | 6/2020 | Hikida | G06T 7/73 |
| 10,705,029 B2* | 7/2020 | Nagata | G01N 21/8806 |
| 10,890,443 B2* | 1/2021 | Abe | G06T 7/70 |
| 10,942,131 B2* | 3/2021 | Nagata | G01N 21/8851 |
| 10,955,358 B2* | 3/2021 | Yoshida | G01B 11/2522 |
| 2012/0069173 A1 | 3/2012 | Takahashi et al. | |

FOREIGN PATENT DOCUMENTS

| | | |
|---|---|---|
| JP | 2012-063268 A | 3/2012 |
| JP | 2017-032496 A | 2/2017 |
| WO | 95/00819 A1 | 1/1995 |

OTHER PUBLICATIONS

Japanese Decision to Grant a Patent issued in corresponding Japanese Patent Application No. 2018-033372, dated Sep. 3, 2019, with English translation.

* cited by examiner

MISALIGNMENT DETECTION DEVICE AND MISALIGNMENT DETECTION METHOD

CROSS REFERENCE TO RELATED APPLICATIONS

This application is the U.S. National Phase under 35 U.S.C. § 371 of International Application No. PCT/JP2018/047289, filed on Dec. 21, 2018, which claims the benefit of Japanese Application No. 2018-033372, filed on Feb. 27, 2018, the entire contents of each are hereby incorporated by reference.

TECHNICAL FIELD

This invention relates to a technique for detecting a misalignment of a center shaft of a workpiece having such an outer peripheral shape that a radial distance from the center axis to an outer peripheral part repeatedly increases and decreases in a circumferential direction and serving as an object to be detected with respect to an axis of rotation when the workpiece rotates about the axis of rotation.

BACKGROUND ART

A workpiece inspection device described, for example, in patent literature 1 is known as a device for inspecting the appearance of a workpiece, in which recesses and projections are repeatedly provided on an outer peripheral part, such as a gear. In this workpiece inspection device, the workpiece is held by a holder coupled to a motor. The workpiece is imaged by a plurality of cameras while being rotated by the motor, and the appearance of the workpiece is inspected based on those captured images.

CITATION LIST

Patent Literature

[Patent literature 1] JP 2012-63268A

SUMMARY OF INVENTION

Technical Problem

In the inspection device for imaging the workpiece while rotating the workpiece in this way, it is necessary that an axis of rotation (center of rotation) when the workpiece is rotated coincides with a mechanical center of the workpiece for accurate appearance inspection. In other words, when there is a rotational workpiece, a technique for detecting whether or not an axis of rotation of the workpiece coincides with a mechanical center or how much the both deviate is necessary. A deviation between a center and an axis of rotation of a workpiece is referred to as a "misalignment".

Here, if an outer peripheral part of the workpiece has a circular shape or a rotationally symmetrical shape such as a spur gear, it is thought possible to detect the misalignment, for example, by the observation of a position variation of the outer peripheral part during one turn of the workpiece. On the other hand, there are also workpieces with an outer peripheral part having a rotationally asymmetric shape. For example, if a workpiece is a tooth-missing gear, teeth provided to project on an outer peripheral part are not arranged at equal intervals in a circumferential direction. Thus, it is difficult to continuously detect a position variation of the outer peripheral part during one turn of the workpiece. A technique for evaluating the presence or absence of a misalignment and the magnitude of the misalignment is required also for such workpieces. However, such a technique has not been established thus far.

Solution to Problem

This invention was developed in view of the above problem and aims to provide a misalignment detection technique capable of reliably detecting a misalignment even if the shape of a workpiece outer peripheral part is not rotationally symmetrical.

One aspect of the invention is a misalignment detection device that detects a misalignment of a center axis with respect to an axis of rotation when a workpiece having such an outer peripheral shape that a distance in a radial direction from the center axis to an outer peripheral part repeatedly increases and decreases in a circumferential direction rotates about the axis of rotation. The device comprises: a storage that stores a reference pattern corresponding to apart of the outer peripheral part; an imager that images the outer peripheral part at least for one turn of the workpiece by such imaging at a fixed point as to include at least a part of the outer peripheral part in an imaging field of view; an image processor that detects a region corresponding to the reference pattern by performing a pattern matching process for an image captured by the imager; and a misalignment detector that detects the misalignment based on information on a position of each of a plurality of the detected regions, wherein the reference pattern corresponds in shape to a plurality of characteristic parts that present on the outer peripheral part, have shapes congruent to each other and have a mutually symmetrical positional relationship with respect to rotation about the center axis.

Other aspect of the invention is a misalignment detection method that detects a misalignment of a center axis with respect to an axis of rotation when a workpiece having such an outer peripheral shape that a distance in a radial direction from the center axis to an outer peripheral part repeatedly increases and decreases in a circumferential direction rotates about the axis of rotation. The method comprises: imaging the outer peripheral part at least for one turn of the workpiece by such imaging at a fixed point as to include at least a part of the outer peripheral part in an imaging field of view; detecting a region corresponding to a reference pattern determined in advance to correspond to a part of the outer peripheral part by performing a pattern matching process for a captured image; and detecting the misalignment based on information on a position of each of a plurality of the detected regions, wherein the reference pattern corresponds in shape to a plurality of characteristic parts that present on the outer peripheral part, have shapes congruent to each other and have a mutually symmetrical positional relationship with respect to rotation about the center axis.

In these inventions, the reference pattern corresponds in shape to a plurality of characteristic parts present on the outer peripheral part, having the shapes congruent to each other and having a mutually symmetrical positional relationship with respect to rotation about the center axis.

In the inventions thus configured, even if the workpiece outer peripheral part is not rotationally symmetrical as a whole, the misalignment between the center axis and the axis of rotation of the workpiece can be detected if the plurality of characteristic parts have the positional relationship symmetrical with respect to rotation about the center axis. The reasons for that are as follows.

In the inventions, the outer peripheral part of the workpiece in rotation is imaged at a fixed point. In this case, a steady point in an image is not a mechanical center, but a center of rotation of the workpiece. However, the center of rotation needs not necessarily be included in the image.

The pattern matching process using the reference pattern corresponding to the characteristic parts, which are parts of the outer peripheral part, is performed for an image obtained by imaging the outer peripheral part of the workpiece in rotation. In this way, the regions having the shapes corresponding to the characteristic parts are detected in the captured image of the outer peripheral part. If the outer peripheral part has a plurality of shapes corresponding to the characteristic parts, a plurality of regions corresponding to those are respectively detected from the image.

Here, a case is considered where a plurality of characteristic parts are at positions mutually symmetrical with respect to rotation about a mechanical center axis of a workpiece. If the center axis and an axis of rotation of the workpiece in rotation perfectly coincide with each other, a plurality of regions respectively corresponding to the plurality of characteristic parts should appear at positions mutually equidistant from the axis of rotation in an image obtained by imaging an outer peripheral part at a fixed point. On the other hand, if there is a misalignment between the center axis and the axis of rotation of the workpiece, distances between the respective characteristic parts and the axis of rotation are not necessarily equal. Thus, positions where the regions corresponding to the characteristic parts are detected in the image vary in a period corresponding to a rotation period of the workpiece with respect to positions when there is no misalignment.

The presence or absence and the magnitude of the misalignment can be detected from such a position change. The plurality of characteristic parts are mutually equidistant from the center axis of the workpiece, whereas the axis of rotation is a steady point in the image. Therefore, the misalignment between the center axis and the axis of rotation of the workpiece can be detected from a variation of the distance between each of the plurality of regions detected in the image and the steady point.

Effect

As described above, according to the invention, the plurality of characteristic parts present on the workpiece outer peripheral part are detected by the pattern matching process and the misalignment between the center axis and the axis of rotation of the workpiece is detected based on that position information. Thus, the misalignment can be detected with high accuracy not only when the shape of the workpiece outer peripheral part is rotationally symmetrical, but also when not.

The foregoing objects and other objects, and new characteristics of the present invention will become more apparent completely by reading detailed description given below by referring to the accompanying drawings. The drawings are merely for explanation and are not intended to limit the scope of the invention.

DESCRIPTION OF EMBODIMENTS

Figure 1:
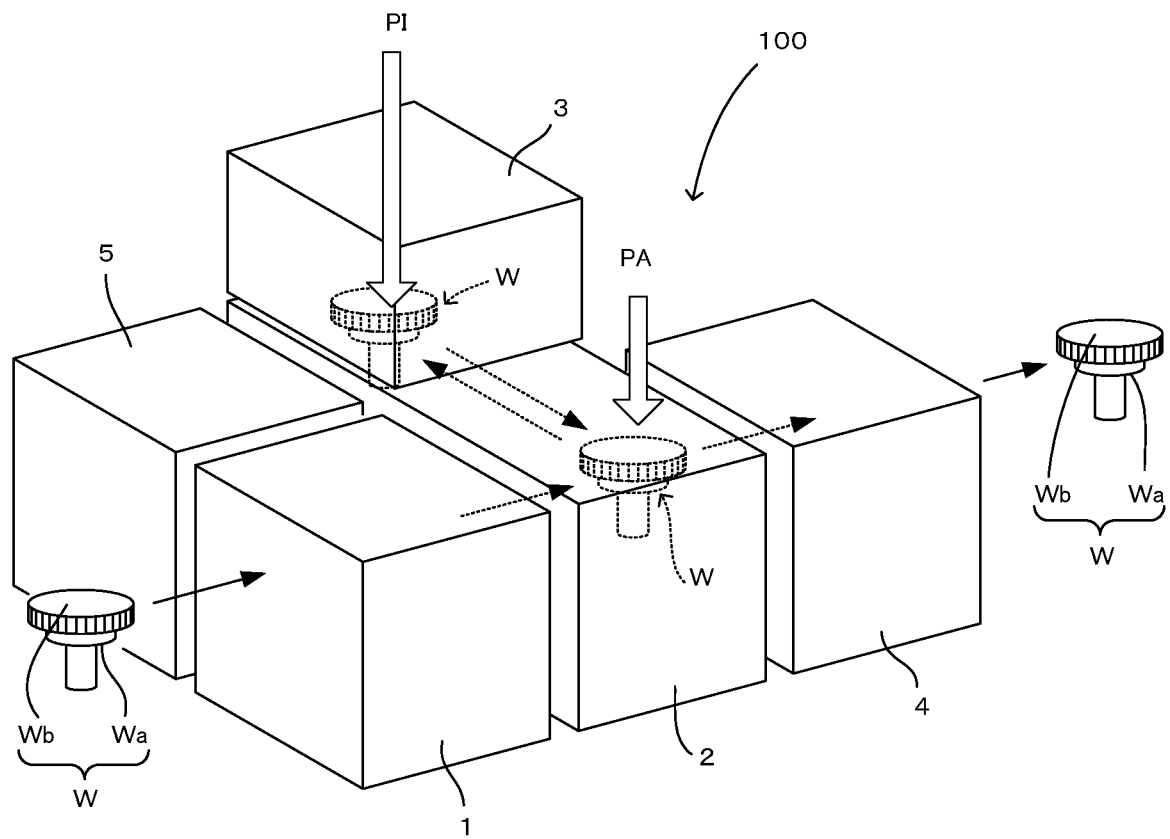
FIG. 1 shows the entire configuration of an inspection apparatus equipped with one embodiment of a misalignment detection device according to the present invention.
Figure 2:
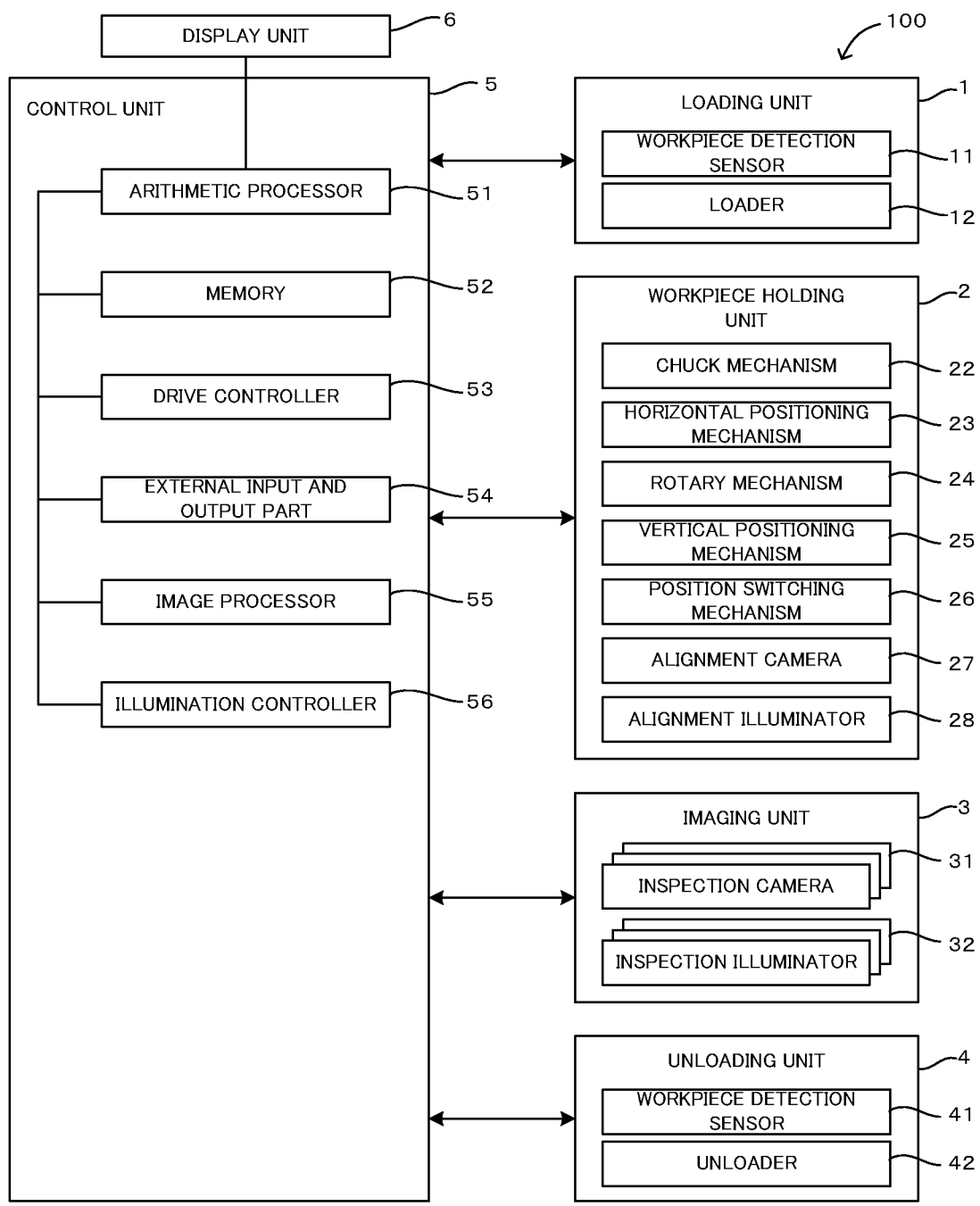
FIG. 2 is a block diagram showing the electrical configuration of the inspection apparatus shown in FIG. 1.

FIG. 1 shows the entire configuration of an inspection apparatus equipped with one embodiment of a misalignment detection device according to the present invention. FIG. 2 is a block diagram showing the electrical configuration of the inspection apparatus shown in FIG. 1. The inspection apparatus 100 is an apparatus for inspecting the appearance of a workpiece W such as a gear or an impeller, for example, having an outer peripheral shape that a radial distance from a mechanical center thereof to an outer peripheral part repeatedly increases and decreases in a circumferential direction. The inspection apparatus 100 includes a loading unit 1, a workpiece holding unit 2, an imaging unit 3, an unloading unit 4, and a control unit 5. As shown in FIG. 1, the workpiece W mentioned herein is a machine part with a shaft Wa and a gear Wb provided at the top of the shaft Wa and is formed by forging or casting, for example. After the part is manufactured, the workpiece W is carried to the loading unit 1 by an external transfer robot or an operator.

The loading unit 1 includes a workpiece housing (not shown in the drawings) such as a table or a storage locker. When a workpiece W is temporarily housed into the workpiece housing by the external transfer robot, for example, a workpiece detection sensor 11 (FIG. 2) at the workpiece housing detects the workpiece W, and transmits a signal indicating the detection to the control unit 5 responsible for control of the apparatus entirely. The loading unit 1 includes a loader 12 (FIG. 2). In response to an operation command from the control unit 5, the loading unit 1 receives an uninspected workpiece W in the workpiece housing and carries the uninspected workpiece W to the workpiece holding unit 2.

Figure 3:
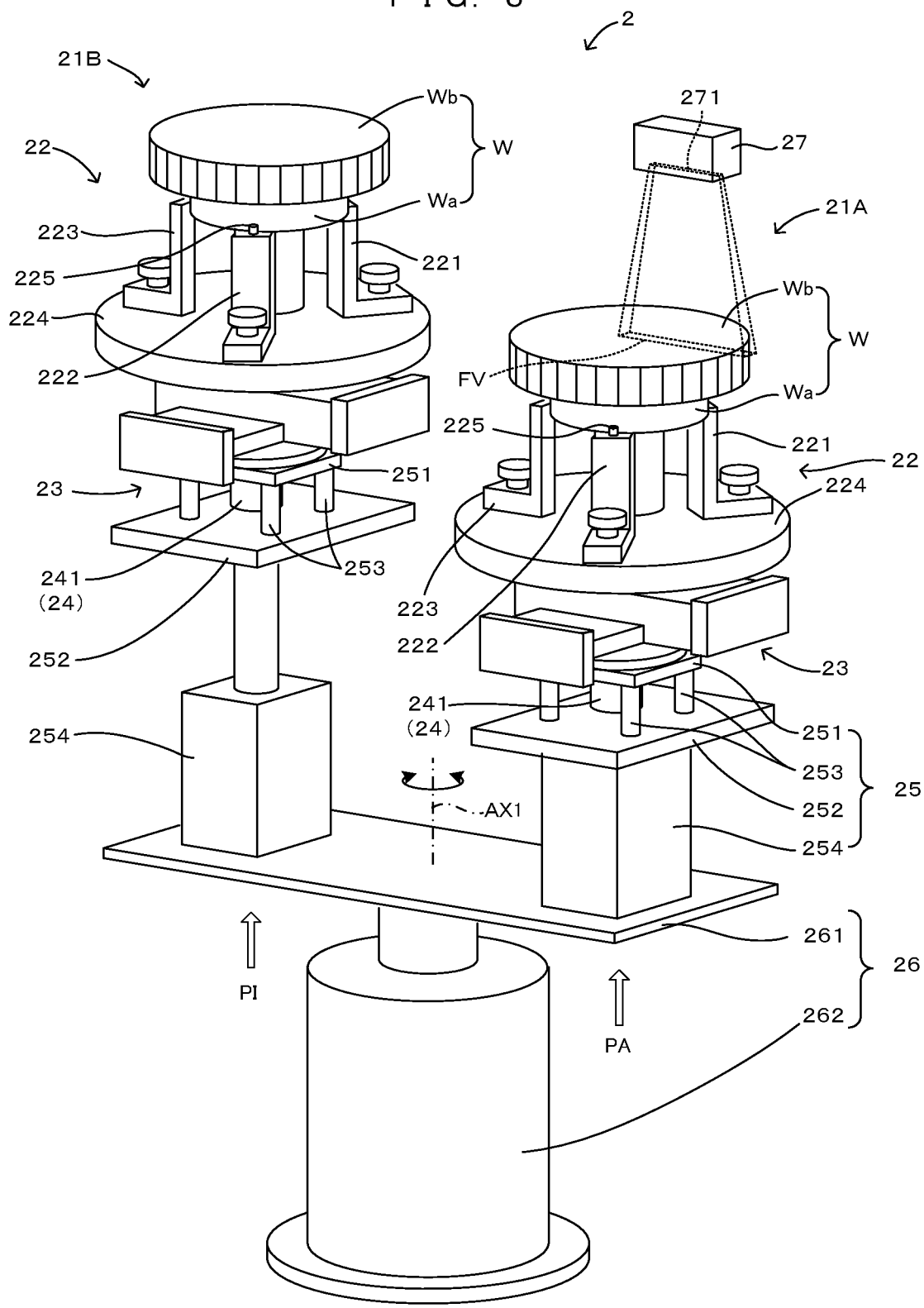
FIG. 3 is a perspective view showing the configuration of the workpiece holding unit.

FIG. 3 is a perspective view showing the configuration of the workpiece holding unit. The workpiece holding unit 2 is equipped with a holding table 21A and a holding table 21B for holding the workpiece W carried by the loader 12. The holding tables 21A and 21B have the same configuration and can hold the workpiece W by grasping a part of the shaft Wa of the workpiece W in a posture in which the gear Wb is in a horizontal position. The configuration of the holding table 21A will be described below by referring to FIG. 3. Meanwhile, as the holding table 21B has the same configuration as the holding table 21A, the holding table 21B will be given the same signs as the holding table 21A and will not be described.

As shown in FIG. 3, the holding table 21A includes a chuck mechanism 22, a horizontal positioning mechanism 23, a rotary mechanism 24, and a vertical positioning mechanism 25 stacked in the vertical direction. The chuck mechanism 22 includes movable members 221 to 223 substantially L-shaped in a side view, and a moving part 224 that moves the movable members 221 to 223 in conjunction with each other in a radial pattern in response to a movement command from the control unit 5. Each of the movable members 221 to 223 has an upper end surface where a projection member 225 is provided, and can be engaged with a stepped part of the shaft Wa using the upper end surface and the projection member 225. Thus, by moving the movable members 221 to 223 to get closer to each other using the moving part 224 in response to a grasp command from the control unit 5, it becomes possible to hold a workpiece W with the center axis of the chuck mechanism 22 (sign AX2 in FIG. 5) and the axis of the shaft Wa matched with each other. Meanwhile, the moving part 224 moves the movable members 221 to 223 to get away from each other in response to a release command from the control unit 5. At this time, it becomes possible to load an uninspected workpiece W using the loading unit 1 or unload an inspected workpiece W using the unloading unit 4.

The chuck mechanism 22 having the foregoing configuration is supported by the horizontal positioning mechanism 23. The horizontal positioning mechanism 23 includes what is called as an XY table for movements in directions orthogonal to each other in the horizontal direction. Thus, driving the XY table in response to a movement command from the control unit 5 allows high-accuracy positioning of the chuck mechanism 22 on a horizontal plane. Note that, as the XY table, a member using a motor and a ball screw mechanism in combination or a member using two linear motors in combination orthogonal to each other in the horizontal direction is applicable, for example.

The rotary mechanism 24 includes a motor 241. A rotary shaft (sign 242 in FIG. 5) of the motor 241 extends vertically upwardly. The horizontal positioning mechanism 23 is connected to the upper end of the rotary shaft. Thus, when a rotation command is given from the control unit 5, the motor 241 is actuated to rotate the horizontal positioning mechanism 23, the chuck mechanism 22, and a workpiece W grasped by the chuck mechanism 22 integrally about the rotary axis (sign AX3 in FIG. 5) of the motor 241.

In the embodiment, the horizontal positioning mechanism 23 is provided between the chuck mechanism 22 and the rotary mechanism 24. This has a technical significance of making the respective positions among the axis of the chuck mechanism 22, the structural and mechanical center (sign AX4 in FIG. 5) of the gear Wb of the workpiece W grasped by the chuck mechanism 22, and the rotary axis of the motor 241 relative to each other adjustable using the horizontal positioning mechanism 23. More specifically, matching the center axis of the chuck mechanism 22 and the rotary axis of the motor 241 with each other allows the workpiece W grasped by the chuck mechanism 22 to rotate about the shaft Wa. In the presence of displacement of the center axis of the gear Wb from the shaft Wa, however, misalignment thereof with respect to the motor 241 occurs to cause unintentional eccentric rotation of the gear Wb. In response to this, the horizontal positioning mechanism 23 is provided to achieve drive so as to correct the amount of the displacement and a direction of the displacement. By doing so, the center axis of the gear Wb and the rotary axis of the motor 241 can be matched with each other. This allows capturing of an image of the gear Wb with high accuracy by the imaging unit 3. As a result, the workpiece W can be inspected with higher accuracy.

The vertical positioning mechanism 25 includes a holding plate 251 holding the motor 241, a base plate 252 arranged below the motor 241, four connecting pins 253 connecting the holding plate 251 and the base plate 252, and an elevator 254 for moving the base plate 252 up and down in the vertical direction. The elevator 254 moves the base plate 252 up and down in response to an up-down command from the control unit 5. This makes the rotary mechanism 24, the horizontal positioning mechanism 23, and the chuck mechanism 22 move integrally in the vertical direction. Accordingly, a workpiece W can be located at an appropriate height position at a pre-alignment position PA and an inspection position PI described next.

As shown in FIG. 3, the holding tables 21A and 21B having the foregoing configuration are fixed on a support plate 261 while being separated by a certain distance. The support plate 261 is supported by a turning driver 262 at an intermediate position between the holding tables 21A and 21B. The turning driver 262 can make the support plate 261 turn 180 degrees about a turning axis AX1 extending in the vertical direction in response to a turning command from the control unit 5. As shown in FIG. 3, the turning driver 262 can make a switch between a first position at which the holding tables 21A and 21B are located at the pre-alignment position PA and the inspection position PI respectively, and a second position at which the holding tables 21A and 21B are located at the inspection position PI and the pre-alignment position PA respectively. For example, in parallel with pre-alignment process on a workpiece W held by the holding table 21A at the pre-alignment position PA, the turning driver 262 makes a switch from the first position to the second position to shift the holding table 21A from the pre-alignment position PA to the inspection position PI. By doing so, the workpiece W after being subjected to the pre-alignment process can be located at the inspection position PI. After inspection of this workpiece W is finished, a turn is made in the opposite direction to shift the holding table 21A from the inspection position PI to the pre-alignment position PA. By doing so, the workpiece W after being subjected to the inspection process can be located at the pre-alignment position PA. In this way, in the embodiment, the support plate 261 and the turning driver 262 form a position switching mechanism 26 for switching the position of the workpiece W.

The pre-alignment position PA is a position where the pre-alignment process is performed as described above. An alignment camera 27 is arranged above the holding table 21A (or 21B) positioned at the pre-alignment position PA. This alignment camera 27 is arranged on a side opposite to the motor 241 with respect to the workpiece W, i.e. above the workpiece W as shown in FIG. 3. The alignment camera 27 includes a line sensor 271 extending radially outward with respect to the center axis AX4 (see FIG. 5) of the workpiece W. The alignment camera 27 is so installed that a longitudinal direction of the line sensor 271 is aligned with a radial direction of the workpiece W. Accordingly, an imaging field of view FV of the alignment camera 27 has a strip shape elongated along the radial direction of the workpiece W from the motor axis of rotation AX3. Further, the imaging field of view FV is so set as to constantly include a part of the workpiece outer peripheral part during one turn of the workpiece W. Thus, the upper surface of the workpiece W can be imaged by the line sensor 271 while the workpiece W is rotated. By causing the workpiece W to make at least one turn, an image is obtained which includes all projections (tooth tips) and recesses (tooth bases) formed on the outer peripheral part of the gear Wb.

While not shown in FIG. 3, an alignment illuminator 28 (FIG. 2) is provided that illuminates a workpiece W held by the holding table 21A (or 21B) for performing the alignment process favorably. Thus, during capturing of an image of the workpiece W by the alignment camera 27, the workpiece W can be illuminated by the alignment illuminator 28 while the workpiece W is rotated by the rotary mechanism 24. Data about the image of the workpiece W is transmitted to the control unit 5. On the basis of this image data, the misalignment is corrected to match the center axis AX4 of the gear Wb and the rotary axis AX3 of the motor 241 with each other, that is, a pre-alignment process is performed.

On the other hand, the inspection position PI is a position at which the inspection process is performed. The imaging unit 3 is arranged above the holding table 21A (or 21B) located at the inspection position PI. At the inspection position PI, an image of a workpiece W can be captured by the imaging unit 3 while the workpiece W is rotated with the center axis AX4 of the gear Wb and the rotary axis AX3 of the motor 241 matched with each other. Data about the image of the workpiece W is transmitted to the control unit 5 to perform the inspection process of inspecting the workpiece W for the presence or absence of scratches, defects, etc. at the gear Wb.

As shown in FIG. 2, the imaging unit 3 includes multiple inspection cameras 31 and multiple inspection illuminators 32. The multiple inspection illuminators 32 of the imaging unit 3 are arranged so as to illuminate a workpiece W from various directions held by the holding table 21A (or 21B) located at the inspection position PI. Images of the workpiece W can be captured from various directions by the inspection cameras 31 while the workpiece W is rotated by the rotary mechanism 24 and the workpiece W is illuminated by the inspection illuminators 32. Multiple pieces of data about the captured images are transmitted to the control unit 5 and the workpiece W is inspected by the control unit 5.

The holding table 21A (or 21B) holding the inspected workpiece W is shifted from the inspection position PI to the pre-alignment position PA by the position switching mechanism 26 as described above. Then, the inspected workpiece W is carried out of the holding table 21A (or 21B) by the unloading unit 4. The unloading unit 4 is basically the same as the loading unit 1. More specifically, the unloading unit 4 includes a workpiece housing (not shown in the drawings) for temporarily housing an inspected workpiece W, a workpiece detection sensor 41 (FIG. 2), and an unloader 42 (FIG. 2). In response to an operation command from the control unit 5, the unloading unit 4 carries the inspected workpiece W from the holding table 21A (21B) to the workpiece housing.

As shown in FIG. 2, the control unit 5 is composed of a well-known central processing unit (CPU) for implementation of logic operations, a read only memory (ROM) storing initial setting and others, a random access memory (RAM) for temporarily storing various types of data generated during operation of the apparatus, etc. The control unit 5 functionally includes an arithmetic processor 51, a memory 52, a drive controller 53, an external input and output part 54, an image processor 55, and an illumination controller 56.

The drive controller 53 controls drive of driven mechanisms such as the loader 12 and the chuck mechanism 22 provided at corresponding positions of the apparatus. The external input and output part 54 inputs signals from various types of sensors installed on corresponding positions of the apparatus, and outputs signals to various types of actuators, etc. installed on corresponding positions of the apparatus. The image processor 55 retrieves image data from the alignment camera 27 and the inspection camera 31 and performs image processing such as binarization. The illumination controller 56 controls turning-on, turning-off, etc. of the alignment illuminator 28 and the inspection illuminator 32.

The arithmetic processor 51 has an arithmetic function, and performs a sequence of processes described next by controlling the drive controller 53, the image processor 55, and the illumination controller 56 in accordance with a program stored in the memory 52.

A sign 6 shown in FIG. 2 means a display unit functioning as an interface with an operator. The display unit 6 is connected to the control unit 5 to fulfill the function of displaying an operating state of the inspection apparatus 100. Additionally, the display unit 6 is configured using a touch panel to fulfill a function as an input terminal to accept input from an operator. The display unit 6 is not limited to this configuration but can be configured using a display device for display of an operating state and input terminals such as a keyboard and a mouse.

Figure 4:
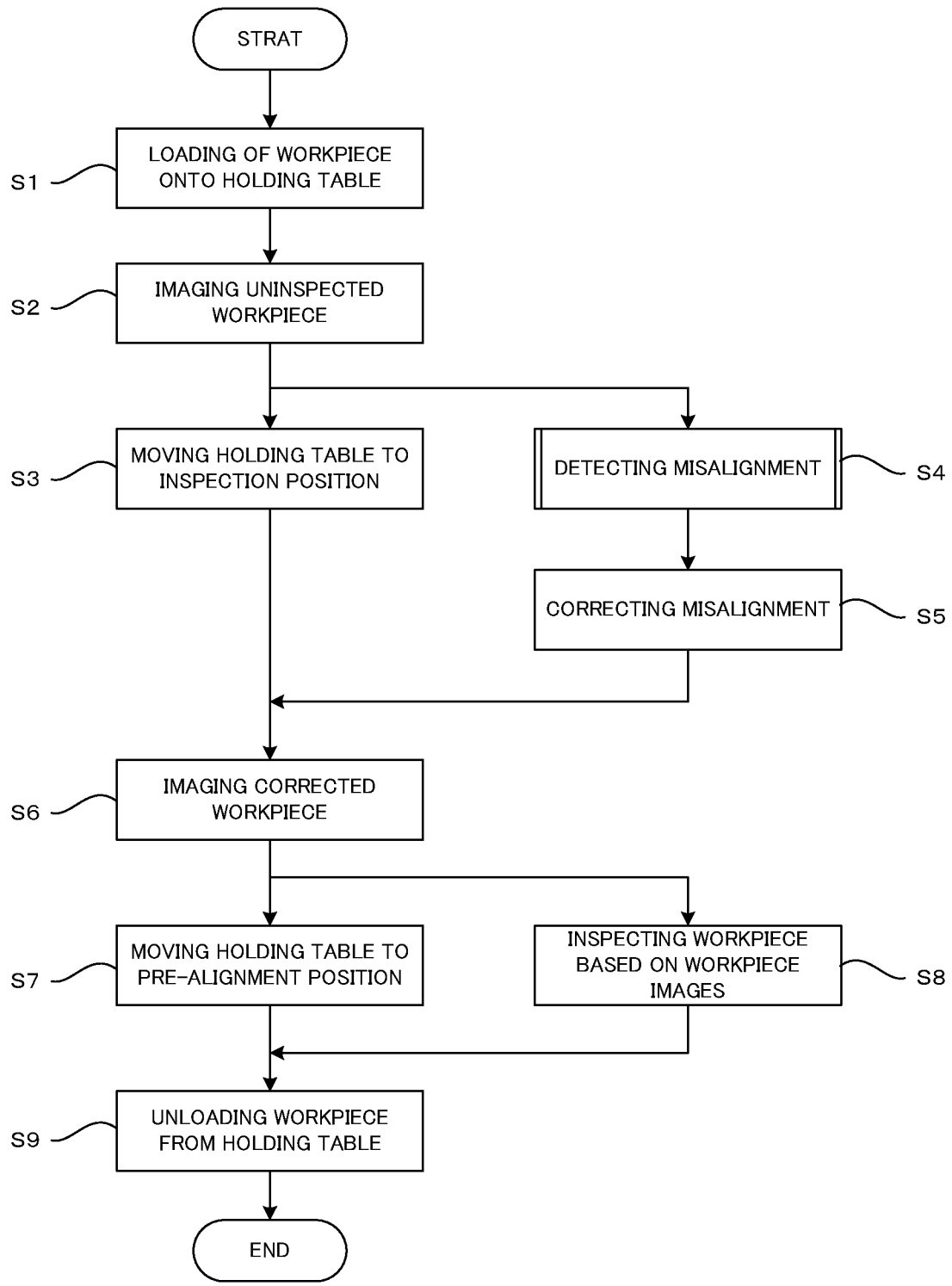
FIG. 4 is a flowchart showing the operation of inspecting a workpiece by the inspection apparatus in FIG. 1.
Figure 5:
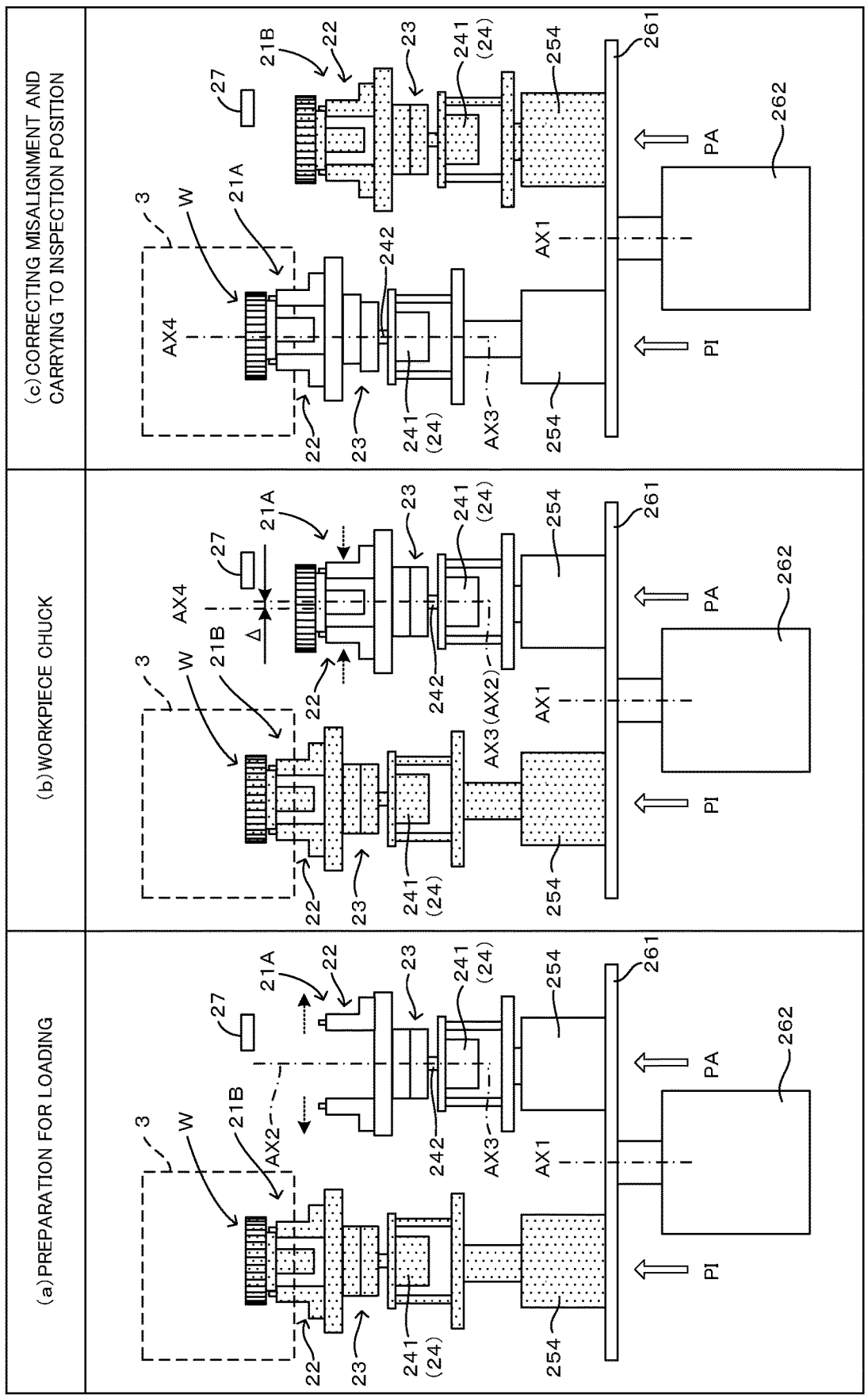
FIG. 5 schematically shows the inspecting operation.

FIG. 4 is a flowchart showing the operation of inspecting a workpiece by the inspection apparatus in FIG. 1. FIG. 5 schematically shows the inspecting operation. To clearly distinguish the operations of the holding tables 21A and 21B in FIG. 5, dots are given to the holding table 21B and a workpiece W held by the holding table 21B.

In the inspection apparatus 100, according to the inspection program stored in advance in the memory 52 of the control unit 5, the arithmetic processor 51 controls each part of the apparatus to execute the following operations. Here, various operations performed on the workpiece W will be described focusing on one workpiece W with reference to FIGS. 4 and 5. When the control unit 5 confirms that there is no workpiece W at the holding table 21A located at the pre-alignment position PA as shown in the section (a) of FIG. 5 and that the workpiece detection sensor 11 detects an uninspected workpiece W housed in the workpiece housing of the loading unit 1, the control unit 5 starts loading of the workpiece W onto the holding table 21A (step S1). In this loading step, the loader 12 grasps the uninspected workpiece W located in the workpiece housing and carries the uninspected workpiece W from the loading unit 1 to the holding table 21A. In the embodiment, for smoothly performing the loading step and a subsequent step of detecting misalignment, before the workpiece W is carried to the holding table 21A, the control unit 5 performs preparation for accepting the workpiece W. That is, the center axis AX2 of the chuck mechanism 22 and the rotary axis AX3 of the motor 241 are matched with each other by the horizontal positioning mechanism 23 as shown in the section (a) of FIG. 5. The three movable members 221 to 223 are moved to get away from each other. By doing so, the preparation for accepting the workpiece W is performed.

When the workpiece W is carried to the holding table 21A by the loader 12, the chuck mechanism 22 moves the three movable members 221 to 223 to get closer to each other as described above to pinch a part of the shaft Wa of the workpiece W and grasp the workpiece W. More specifically, during the loading operation, the movable members 221 to 223 are moved to get closer each other and the respective upper end surfaces and the respective projection members 225 of the movable members 221 to 223 are engaged with the stepped part of the shaft Wa. Thus, while matching the center axis AX2 of the chuck mechanism 22 and the axis of the shaft Wa with each other, the workpiece W is held (see the section (b) of FIG. 5). In this way, the loading step is finished. At the time of the finish, the rotary axis AX3 of the motor 241, the center axis AX2 of the chuck mechanism 22, and the axis of the shaft Wa are matched with each other. However, in some case that the workpiece W is manufactured by forging or casting, the center axis AX4 of the gear Wb is displaced from the axis of the shaft Wa to cause misalignment of the workpiece W with respect to the motor 241 as shown in the section (b) of FIG. 5, for example.

In this regard, in the embodiment, the uninspected workpiece W is illuminated by the alignment illuminator 28 (FIG. 2). An image of the gear Wb is captured by the alignment camera 27 while the uninspected workpiece W is rotated by the motor 241 of the holding table 21A. Data about the image is stored into the memory 52 (step S2).

After this imaging is finished, the turning driver 262 makes a switch from the first position to the second position. More specifically, the turning driver 262 turns the support plate 261 180 degrees about the turning axis AX1. By doing so, as shown in the section (c) of FIG. 5, the holding table 21A holding the uninspected workpiece W is moved from the pre-alignment position PA to the inspection position PI. The elevator 254 moves the workpiece W to a height position at which an image of the workpiece W can be captured by the imaging unit 3 (step S3).

In the embodiment, a misalignment correction is performed in parallel with the foregoing movements. That is, the image data about the workpiece W is read from the memory 52 and misalignment of the workpiece W with respect to the rotary mechanism 24 (motor 241) is detected (step S4). In the embodiment, the misalignment corresponds to information containing a displacement amount A and a displacement direction. Next, the misalignment is corrected at the holding table 21A (step S5). Note that the step of detecting the misalignment is described in detail later. This misalignment correction is made by moving the chuck mechanism 22 using the horizontal positioning mechanism 23 so as to eliminate the misalignment detected in step S4 described above. By doing so, as shown in the section (c) of FIG. 5, the symmetry axis of the gear Wb and the rotary axis of the motor 241 are matched with each other at the time of arrival of the holding table 21A at the inspection position PI, or before or after the arrival. Thus, a workpiece imaging step (step S6) can be started immediately.

In step S6, the rotary mechanism 24 of the holding table 21A located at the inspection position PI is actuated to start workpiece rotation. In this step, the workpiece W held by the holding table 21A is in a so-called aligned state, which has undergone the foregoing misalignment correction, and rotates about the center axis AX4. In response to this rotation, the plurality of inspection illuminators 32 are turned on to illuminate the rotating workpiece W from multiple directions. While the inspection illuminators 32 are turned on after the workpiece rotation, this is not the only timing for the turning-on. The turning-on of the inspection illuminators 32 may be started simultaneously with start of the rotation or before start of the rotation.

While the workpiece W is rotated and illuminated in this way, the plurality of inspection cameras 31 capture images of the workpiece W from various directions. Image data about the images of the workpiece W (hereinafter called "workpiece images") captured from the multiple directions is transmitted to the control unit 5. The control unit 5 stores the transmitted image data into the memory 52, and inspects the workpiece W on the basis of the stored image data by following timing described below.

After the images are acquired in this way, the workpiece rotation is stopped at the holding table 21A, and the inspection illuminators 32 are turned off at the imaging unit 3. Further, the turning driver 262 turns the support plate 261 reversely 180 degrees about the turning axis AX1. By doing so, the holding table 21A is moved from the inspection position PI to the pre-alignment position PA while holding the inspected workpiece W. Further, the elevator 254 moves the workpiece W to its original height position (step S7). In parallel with this movement of the workpiece W, the control unit 5 reads the image data from the memory 52. Then, the control unit 5 determines the presence or absence of scratches, defects, etc. at the gear Wb on the basis of the read workpiece images. In this way, workpiece inspection is conducted on the workpiece W held by the holding table 21A (step S8).

The workpiece W having returned to the pre-alignment position PA is grasped by the unloader 42. Thereafter, the workpiece W is released from the grasp by the movable members 221 to 223. Thus, the transfer of the workpiece W from the holding table 21A to the unloader 42 is carried out. Next, the unloader 42 carries the workpiece W to the unloading unit 4 and houses the workpiece W into the workpiece housing (not shown in the drawings) (step S9). The foregoing sequence of steps (steps S1 to S9) is performed repeatedly and alternately by the holding tables 21A and 21B.

Next, a misalignment detection step (Step S4) performed in this embodiment is described. In this embodiment, prior to the misalignment detection step, the center axis AX2 of the chuck mechanism 22 and the axis of rotation AX3 of the motor 241 are caused to coincide by the horizontal positioning mechanism 23. Thus, a shaft part Wa of the workpiece W held by the chuck mechanism 22 coincides with the axis of rotation AX3 of the motor 241. However, in the workpiece W formed by forging or the like, the center axis AX4 of the gear Wb may deviate from a shaft center of the shaft part Wa and a misalignment may occur with respect to the motor 241. Accordingly, in this embodiment, the misalignment of the workpiece W loaded on the holding table 21A is detected by a procedure described in detail below. Note that since a misalignment is detected exactly similarly also for the workpiece W held on the holding table 21B, the misalignment detection of this workpiece W is not described.

Figure 6A:
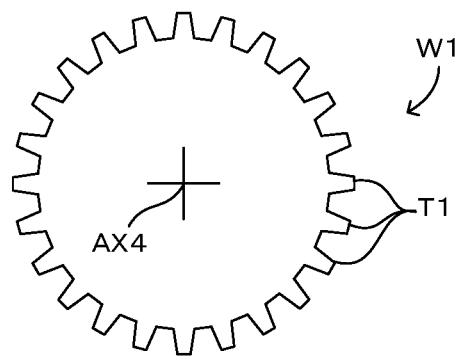
FIG. 6A is a first diagram illustrating the shape of the workpiece to which an embodiment is applied.
Figure 6B:
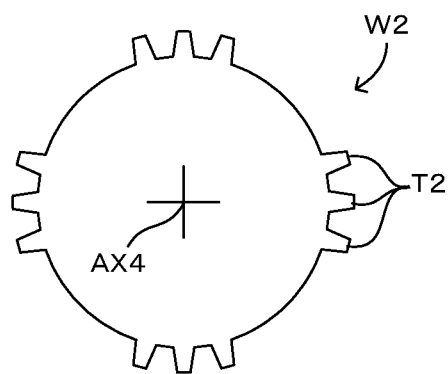
FIG. 6B is a second diagram illustrating the shape of the workpiece to which the embodiment is applied.
Figure 6C:
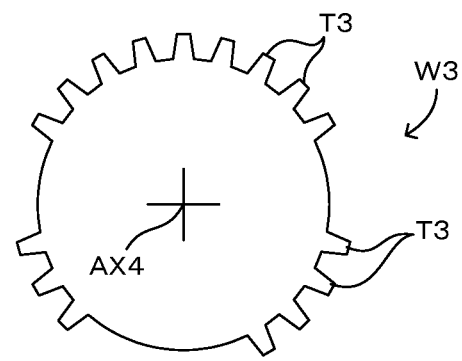
FIG. 6C is a third diagram illustrating the shape of the workpiece to which the embodiment is applied.

FIGS. 6A to 6C are diagrams illustrating workpiece shapes to which a misalignment detection method of this embodiment is applicable. An outer peripheral part of a workpiece W1 shown in FIG. 6A is so shaped that projections (teeth) T1 are arranged radially to project radially outward from a mechanical center axis AX4 of the workpiece W1 and at equal intervals in a circumferential direction, for example, similarly to a general spur gear. On the other hand, both a workpiece W2 shown in FIG. 6B and a workpiece W3 shown in FIG. 6C have an outer peripheral part shaped by removing some teeth from the workpiece W1 of FIG. 6A. Gears having such outer peripheral shapes are called tooth-missing gears and are used, for example, for intermittent power transmission. Out of these, the workpiece W2 includes teeth T2 arranged unevenly in the circumferential direction, but has a rotational symmetry of 90°, i.e. ($\pi/2$) [rad] with respect to a center axis AX4. On the other hand, in the workpiece W3, teeth T3 are arranged unevenly in the circumferential direction and the outer peripheral shape of the workpiece W3 is not rotationally symmetrical with respect to rotation about the center axis AX4.

The misalignment detection method of this embodiment described next can also deal with any of the shapes of these workpieces W1 to W3. Further, as described later, the shapes of workpieces to be processed are not limited to these. It is sufficient for the workpiece W to have an outer peripheral shape of a surface to be imaged by the alignment camera 27 as specified in this specification and the structures of parts other than that do not matter. A basic principle and a specific process flow of the misalignment detection method in this embodiment are successively described below. In the description of these, a case where the workpiece W2 shaped as shown in FIG. 6B is the workpiece W to be processed is described as an example. However, contents of the process are not much different even if a workpiece has another shape.

Figure 7A:
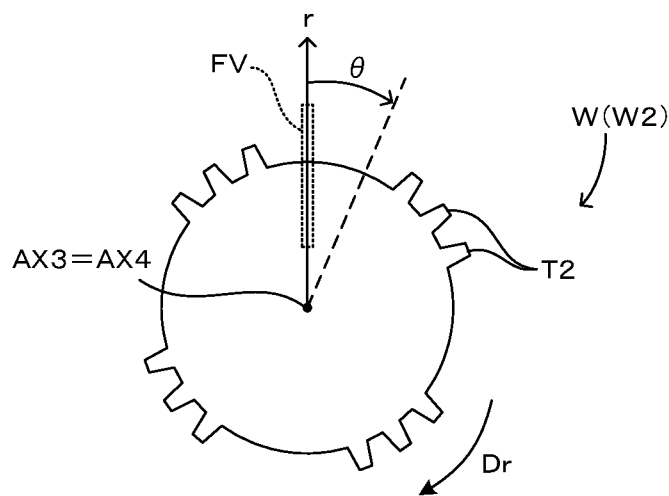
FIG. 7A is a first diagram illustrating the principle of the misalignment detection method of the embodiment.
Figure 7B:
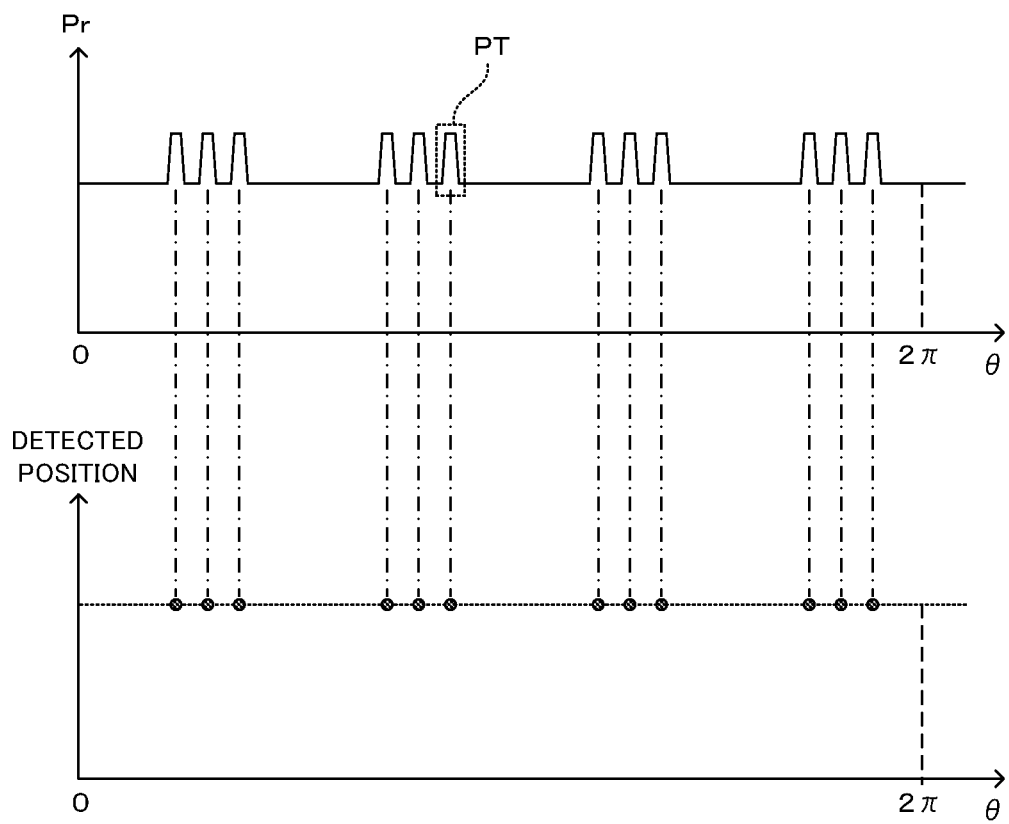
FIG. 7B is a second diagram illustrating the principle of the misalignment detection method of the embodiment.
Figure 8A:
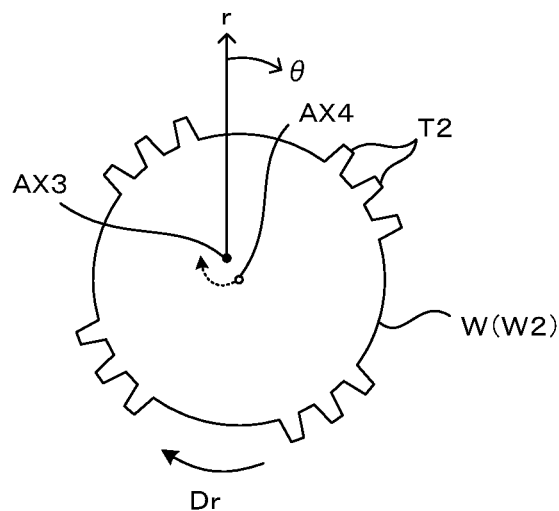
FIG. 8A is a third diagram illustrating the principle of the misalignment detection method of the embodiment.
Figure 8B:
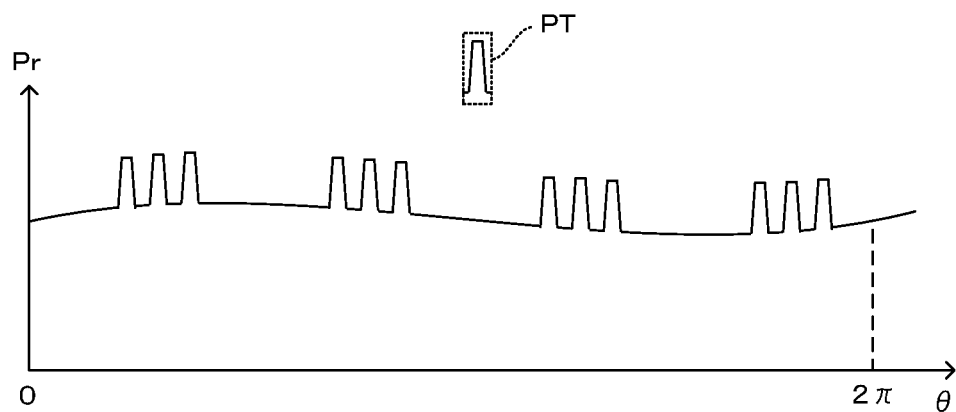
FIG. 8B is a fourth diagram illustrating the principle of the misalignment detection method of the embodiment.
Figure 8C:
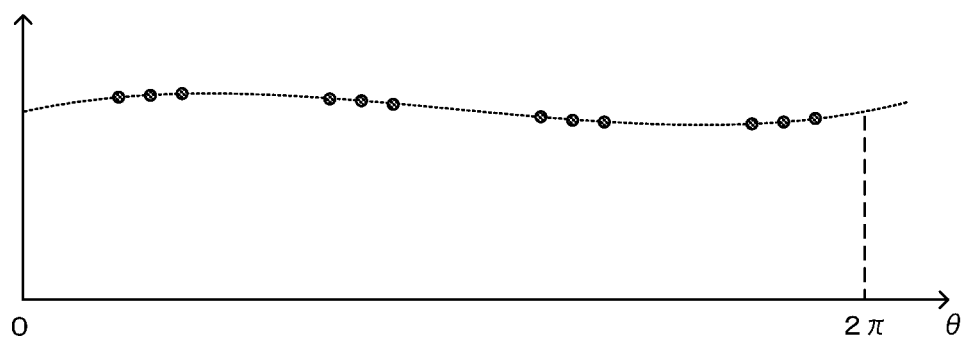
FIG. 8C is a fifth diagram illustrating the principle of the misalignment detection method of the embodiment.

FIGS. 7A, 7B and 8A to 8C are diagrams and charts showing the principle of the misalignment detection method of this embodiment. More specifically, FIGS. 7A and 7B are a diagram and a chart showing a characteristic of an image captured by the alignment camera 27 when there is no misalignment, and FIGS. 8A to 8C are a diagram and charts showing a characteristic of an image captured by the alignment camera 27 when there is a misalignment.

First, a case where the mechanical center axis AX4 of the workpiece W and the motor axis of rotation AX3 coincide, i.e. there is no misalignment is described with reference to FIGS. 7A and 7B. As described above, the line sensor 271 of the alignment camera 27 is so arranged that the longitudinal direction thereof is aligned with the radial direction of the workpiece W from the motor axis of rotation AX3. Thus, the imaging field of view FV of the alignment camera 27 is also elongated in the same direction.

For later description, a two-dimensional coordinate system with the motor axis of rotation AX3 set as an origin, a radius vector r set in the radial direction of the workpiece W and a deflection angle $\theta$ set in the circumferential direction as shown in FIG. 7A is introduced. For the deflection angle $\theta$, $\theta=0$ in an extending direction of the imaging field of view FV of the alignment camera for the sake of convenience. A radius vector direction corresponds to the radial direction of the workpiece W and the deflection angle $\theta$ corresponds to a rotational phase angle of the workpiece W.

If the workpiece W is rotated at a constant speed, a part of the outer peripheral part of the workpiece W to be included in the imaging field of view FV changes every second. The alignment camera 27 successively obtains pieces of image data of one-dimensional line images in the imaging field of view FV output from the line sensor 271 and outputs those to the control unit 5. The image processor 55 of the control unit 5 arrays the pieces of the image data of the line images successively transmitted from the alignment camera 27 in chronological order. In this way, image data is generated which corresponds to a two-dimensional image in which the line images are arrayed in a direction orthogonal to a longitudinal direction of the line images. The two-dimensional image may be binarized using an appropriate threshold value to reduce the influence of noise, uneven illumination and the like.

The two-dimensional image generated in this way is a linear expansion of the outer peripheral part of the workpiece W having a substantially circumferential shape. More specifically, the two-dimensional image is an image obtained by plotting the position of a boundary Pr between regions inside and outside the outer peripheral part of the workpiece W in relation to the deflection angle $\theta$ as shown in FIG. 7B. With the workpiece W (W2) shown in FIG. 7A, an image is obtained in which a part corresponding to the tooth T2 projects upward from a horizontal line corresponding to the tooth base according to the disposed position of the tooth T2. This image pattern is repeated for one turn of the workpiece, i.e. in a period of a deflection angle $2\pi$ [rad].

A case is considered where a pattern matching process is performed for the two-dimensional image of one turn of the workpiece obtained in this way using an image pattern PT corresponding to one tooth T2 of the workpiece W as a reference pattern. In this way, regions corresponding to each of the plurality of teeth T2 provided on the workpiece W are detected from the image. If positions (positions in the direction of the radius vector r) where the regions corresponding to the reference pattern PT were detected in the image are plotted in relation to the deflection angle $\theta$, a result as shown in a lower chart of FIG. 7B is obtained. The position of each region can be expressed by coordinate values representing this region. For example, coordinates of a center of gravity, coordinates of a left-upper corner or the like of the detected region can be used. Representative coordinate values may be determined by the same rule for a plurality of detected regions.

The shapes of the respective teeth T2 of the workpiece W are congruent to each other and rotationally symmetrical with respect to rotation about the center axis AX4. That is, the respective teeth T2 are provided at positions equidistant from the center axis AX4 in the radial direction and different from each other in the circumferential direction. Accordingly, if the center axis AX4 of the workpiece W and the axis of rotation AX3 of the motor 241 coincide, the position in the radius vector direction of the region detected as corresponding to the reference pattern PT should be the same for all the teeth T2. Specifically, it is thought that a single straight line is obtained if the coordinates of the detected positions are connected.

Next, a case is considered where there is a misalignment between the center axis AX4 of the workpiece W and the axis of rotation AX3 of the motor 241 as shown in FIG. 8A. In this case, since a center axis when the workpiece W rotates is the axis of rotation AX3, the center axis AX4 of the workpiece W revolves around the motor axis of rotation AX3 as shown by a dotted line arrow.

A positional relationship of the alignment camera 27 and the axis of rotation AX3 of the motor 241 is determined in advance. Accordingly, in an image obtained by the alignment camera 27, the axis of rotation AX3 is a steady point whose position does not change upon rotation. Even if the axis of rotation AX3 is located outside the imaging field of view FV, the position of each point in the image can be expressed by a distance from the motor axis of rotation AX3. That is, a straight line is obtained as in FIG. 7B if points equidistant from the motor axis of rotation AX3 in the image are connected.

On the other hand, the respective teeth T2 of the workpiece W are provided to be mutually equidistant from the center axis AX4 of the workpiece W. Thus, if there is a positional deviation between the center axis AX4 and the motor axis of rotation AX3, the distances from the motor axis of rotation AX3 to the respective teeth T2 are not necessarily equal. As a result, in a two-dimensional image obtained by imaging the outer peripheral part of the workpiece W by the alignment camera 27, the position of the boundary Pr between the inside and outside of the workpiece W periodically varies to correspond to a rotation period of the workpiece W as shown in FIG. 8B.

The pattern matching process based on the reference pattern PT corresponding to the shape of one tooth T2 is performed for the two-dimensional image of this case as in the aforementioned case. Then, as shown in FIG. 8C, a detected position in the radius vector direction of a region corresponding to the reference pattern PT also periodically varies. The larger the misalignment, the larger the amplitude of the variation.

In other words, the presence or absence of the misalignment and the magnitude of the misalignment can be detected by detecting whether or not the positions of the regions detected by the pattern matching process vary in the radius vector direction and by obtaining the magnitude of that variation.

The variation of the detected position in FIG. 8C is thought to be based on a sine function having a period of $2\pi$ [rad] in the direction of the deflection angle $\theta$. Accordingly, if the position coordinates of the region corresponding to each tooth T2 detected by the pattern matching process are fitted by an appropriate sine function, this sine function can quantitatively express a misalignment.

A sine function $f(\theta)$ using an angle $\theta$ as a variable can be generally written as follows. Physical meanings of constants A, B, C and D in the following (Equation 1) are described with reference to FIGS. 9A and 9B.

[Equation 1]

$$f(\theta) = A \cdot \sin(B \cdot \theta + C) + D \quad \text{(EQUATION 1)}$$

Figure 9A:
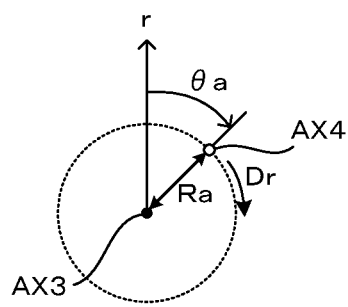
FIG. 9A is a first diagram showing the meaning of the constant in the sine function.
Figure 9B:
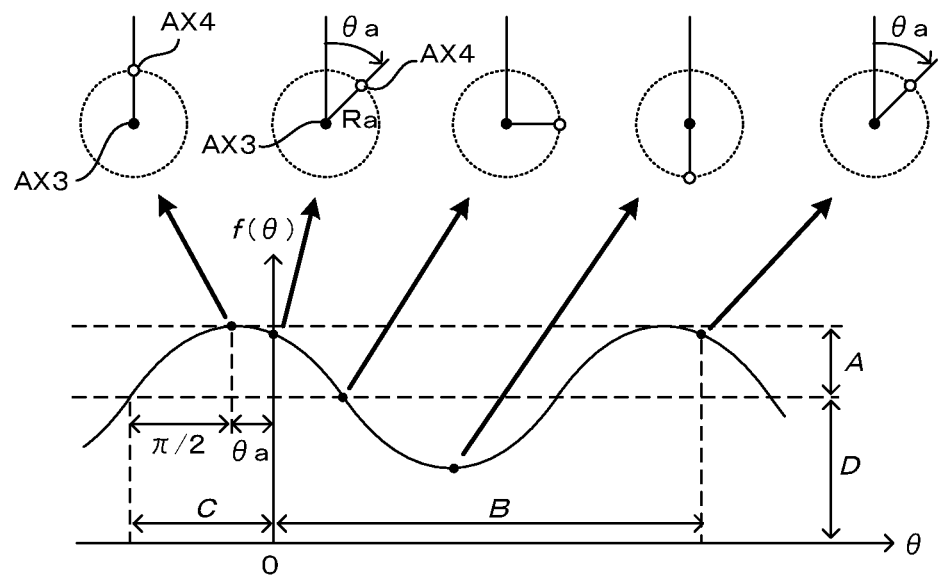
FIG. 9B is a second diagram showing the meaning of the constant in the sine function.

FIGS. 9A and 9B are a diagram and a chart showing the meanings of the constants in the sine function. FIG. 9A illustrates a positional relationship of the center axis AX4 of the workpiece W and the axis of rotation AX3 of the motor 241 in an initial state ($\theta=0$) before the rotation of the workpiece. As can be understood from FIG. 9A, a distance Ra between the center axis AX4 of the workpiece W and the axis of rotation AX3 of the motor 241 represents a misalignment amount, i.e. the magnitude of the misalignment. Further, a deflection angle $\theta a$ represents a direction of the misalignment.

FIG. 9B shows a positional relationship of the workpiece center axis AX4 with the motor axis of rotation AX3 changing according to the rotation of the workpiece W and to which point on a sine curve this positional relationship corresponds. If the positions of regions detected by the pattern matching process using the reference pattern PT are approximated by the sine function of (Equation 1), the following point becomes clear from the relationship shown in FIG. 9B. When the workpiece W having the misalignment as described above is rotated by the motor 241, the constant A representing an amplitude has information corresponding to the misalignment amount Ra. Further, the constant C for shifting the sine curve in a direction $\theta$ has information relating to a misalignment direction $\theta a$.

The constant B relates to a period of the sine function, but may be 1 if the deflection angle $\theta$ is considered as the rotational phase angle of the workpiece W. Further, the constant D is an offset amount corresponding to the distance from the motor axis of rotation AX3, which is a steady point of the image, to each tooth T2. However, the constant D needs not be considered in obtaining a relative distance Ra between the motor axis of rotation AX3 and the workpiece center axis AX4. Specifically, D may be 0. Thus, if the constants A, C of (Equation 1) are substantially obtained, the misalignment amount Ra and the misalignment direction $\theta a$ can be specified from the values of those constants.

To quantitatively obtain the misalignment between the motor axis of rotation AX3 and the workpiece center axis AX4, specifically the misalignment amount and the misalignment direction, in the above way, the following processes may be successively performed.

(1) Rotate the workpiece W and obtain line images by imaging the outer peripheral part of the workpiece W at a fixed point at least for one turn of the workpiece W.

(2) Generate a two-dimensional image by arraying the line images for one turn of the workpiece W.

(3) Perform the pattern matching process for the two-dimensional image and detect regions corresponding to the reference pattern PT corresponding to the shape of the teeth T2 of the outer peripheral part of the workpiece W.

(4) Specify a sine function for approximating a distribution of the positions of the detected regions.

(5) Specify a misalignment amount and a misalignment direction from constants of the sine function.

Specific processing contents are described below.

Figure 10:
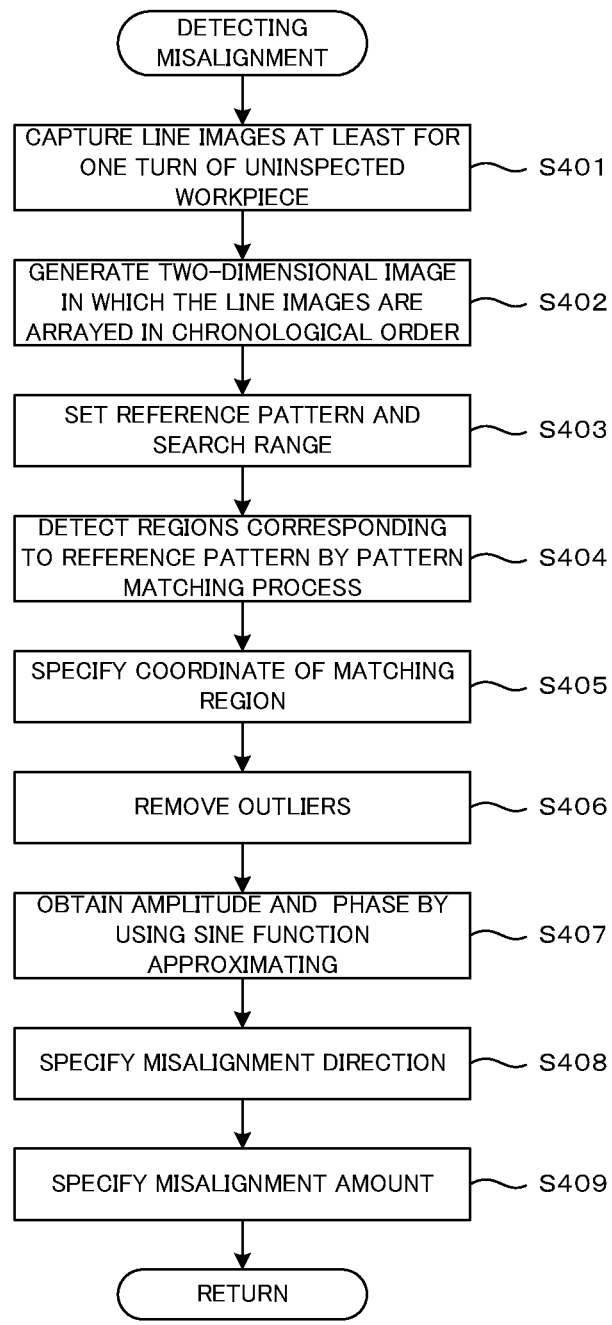
FIG. 10 is a flow chart showing the misalignment detection process in the embodiment.

FIG. 10 is a flow chart showing the misalignment detection process in this embodiment. This process is a process corresponding to Step S4 of FIG. 4. This process is realized by the arithmetic processor 51 provided in the control unit 5 executing a control program prepared in advance to control each component of the device and perform a predetermined operation. The control program causes each component of the device to perform the above processes (1) to (5).

At first, while an uninspected workpiece W is rotated by the motor 241, line images each including a part of an outer peripheral part of the workpiece W are captured by the alignment camera 27 for one turn of the workpiece W (Step S401). Then, image data corresponding to a two-dimensional image in which the line images for one turn are arrayed in chronological order is generated (Step S402). Note that, here, it is sufficient to obtain such image data as to enable a set of many line images to be treated similarly to a two-dimensional image and it is not necessary to actually output a two-dimensional image. A smoothing process or a binarization process may be performed for two-dimensional image data by an appropriate filter for the convenience of the later pattern matching process.

Subsequently, a reference pattern PT and a search range in the image in the pattern matching process are set based on pre-registration information stored in advance in the memory 52 (Step S403). The reference pattern PT is determined in advance according to the shape of the workpiece W and stored in the memory 52. Further, regions corresponding to the reference pattern PT do not randomly appear in the image and can be predicted to a certain extent from the shape of the workpiece W. In such a case, it becomes unnecessary to search for the entire image and the process can be speeded up by limiting the search range based on prediction. Such setting information on the search range is also saved in advance in the memory 52. The arithmetic processor 51 reads these pieces of information from the memory 52 according to the type of the workpiece W to be processed and applies these to the pattern matching process. If no problem occurs during a process time, the narrowing of the search range may be omitted.

Subsequently, the pattern matching process is performed by the image processor 55 based on the set reference pattern PT and search range. In this way, the regions corresponding to the reference pattern PT are searched in the two-dimensional image (Step S404). A known image processing technique can be applied as the pattern matching process. For example, a normalized correlation method can be used. If the region corresponding to the reference pattern PT is detected, coordinate information representing the position of the region is specified and stored in the memory 52 (Step S405).

Position information data obtained in this way could include unnecessary data (outliers) mainly due to erroneous detection in the matching process. Accordingly, a process for removing such outliers is performed prior to approximation to a sine function by the image processor 55 or the arithmetic processor 51 (Step S406).

As described above, the positions of the regions detected by the pattern matching process are thought to be distributed on substantially one sine function curve. However, in the pattern matching process not setting complete coincidence with the reference pattern PT as a detection condition, positions largely distanced from the sine function curve are possibly included in a detection result, for example, due to noise in the image. There are various possible methods for removing such outliers. An example is described here.

Figure 11A:
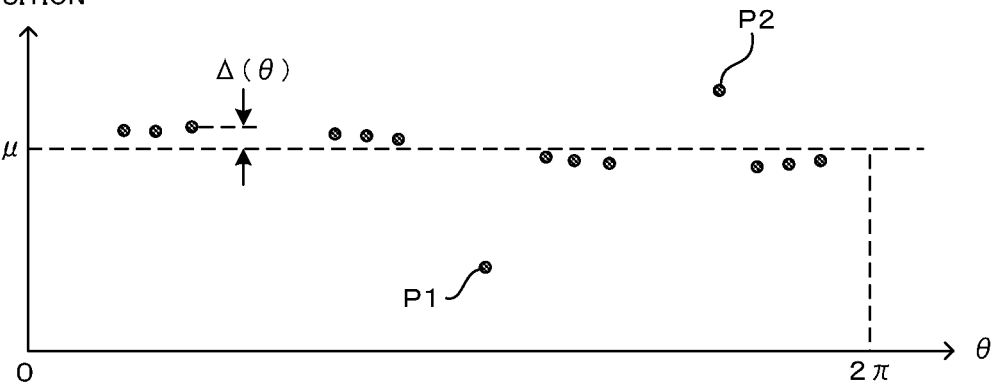
FIG. 11A is a first diagram illustrating the principle of outlier removal of the embodiment.
Figure 11B:
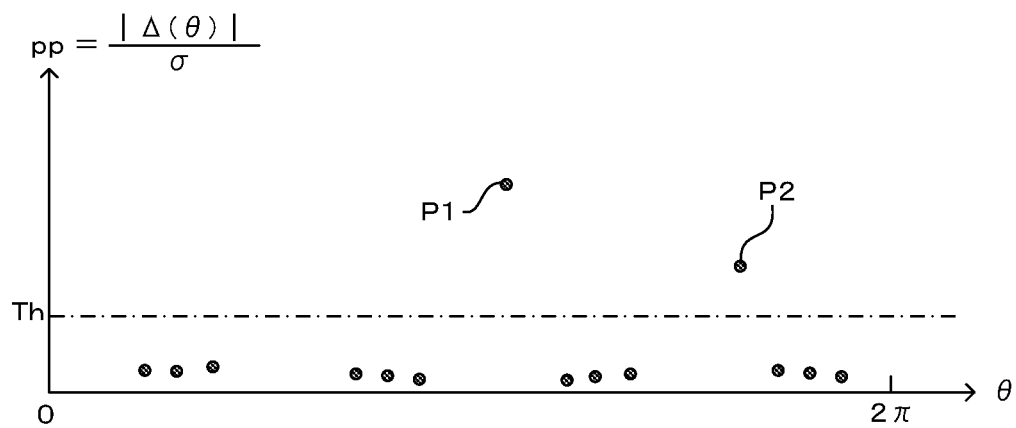
FIG. 11B is a second diagram illustrating the principle of outlier removal of the embodiment.
Figure 11C:
FIG. 11C is a third diagram illustrating the principle of outlier removal of the embodiment.
Figure 11C:

FIGS. 11A to 11C are charts showing a principle of outlier removal of this embodiment. This process utilizes such a property that abnormal data possibly have random values, but proper data does not largely deviate from an average value. In this process, a set of coordinate values of the positions (in the radius vector direction) in the two-dimensional image of a plurality of respective regions detected by the pattern matching process is set as a population and values of an average $\mu$ and a standard deviation $\sigma$ of this population are obtained.

Then, as shown in FIG. 11A, a difference $\Delta(\theta)$ between each element in the population and the average value $\mu$ is obtained for each element. In the proper data, this value $\Delta(\theta)$ is thought to be relatively small. On the other hand, elements denoted by P1, P2 in FIG. 11A largely deviate from the average value $\mu$ and should be regarded as outliers. In such elements, the values of $\Delta(\theta)$ are relatively large. A value of a ratio of $\Delta(\theta)$ of each element obtained in this way to the standard deviation $\sigma$ is used as an evaluation value pp indicating the significance of each element. Specifically, the evaluation value pp is obtained by the following equation:

$pp=|\Delta(\theta)|/\sigma.$

To evaluate the magnitude of a deviation from the average value, an absolute value is used as a numerator on the right side.

As shown in FIG. 11B, the evaluation values pp are small values for the proper data. On the other hand, as indicated by P1, P2, the evaluation values pp are large in data having a high possibility of outliers. Accordingly, an appropriate threshold value Th can be set for the evaluation values pp and the element having the evaluation value pp larger than the threshold value Th can be regarded as an outlier.

Out of the position coordinates of the regions detected by the pattern matching process, those regarded as outliers by the above process are excluded. By doing so, abnormal data possibly adversely affecting approximation to the sine function can be removed as shown in FIG. 11C. By applying sine function approximation to the data having the outliers removed in this way, the accuracy of final calculation results of the misalignment amount and the misalignment direction can be improved.

Referring back to FIG. 10, the misalignment detection process is further described. The arithmetic processor 51 performs fitting to (Equation 1) using the data (position coordinate data of the regions corresponding to the reference pattern PT) after outlier removal (Step S406). Specifically, each constant of (Equation 1) that best approximates the obtained data is specified. As described above, the constants necessary to obtain the misalignment amount Ra and the misalignment direction $\theta$a are the variable A relating to the amplitude and the variable C relating to the phase and the variables B, D need not be considered.

Various methods for realizing such function approximation have been proposed. For example, a Levenberg-Marquardt method, a Gauss-Newton method and the like are known as such. Also in this embodiment, these techniques can be applied. Here, the Gauss-Newton method is described as an example. A principle of the Gauss-Newton method is known and, hence, is not described in detail here. A basic principle is to numerically calculate residuals between a value of the function obtained by appropriately setting values of constants and actual data samples and to converge each constant to minimize the residuals.

In the case of this embodiment, out of the position coordinate data after outlier removal, half the difference between a maximum value (coordinate most distant from the axis of rotation AX3) and a minimum value (coordinate closest to the axis of rotation AX3) can be used as an initial value $A_0$ of the amplitude A. Further, an initial value $C_0$ of the phase C may be set at 0. As described above, the constant B can be set at 1 and the constant D can be set at 0.

Specifically, the following simultaneous equation (2) is prepared, and the initial values $A_0$, $C_0$ of the variables A, C are substituted into (Equation 2) to solve ($\Delta A$, $\Delta C$). Convergence is detected while the solutions $\Delta A$, $\Delta C$ are updated, whereby the constants A, C are determined and a function having a smallest error with respect to the actual data can be obtained (Step S407).

[Equation 2]

$$\left( \begin{matrix} \left[ \sum \left( \frac{\partial f}{\partial A} \right)^2 \right] & \left[ \sum \frac{\partial f}{\partial A} \frac{\partial f}{\partial C} \right] \\ \left[ \sum \frac{\partial f}{\partial A} \frac{\partial f}{\partial C} \right] & \left[ \sum \left( \frac{\partial f}{\partial C} \right)^2 \right] \end{matrix} \right) \left( \begin{matrix} \Delta A \\ \Delta C \end{matrix} \right) = \quad \text{(EQUATION 2)}$$

$$\left( \begin{matrix} \sum \left( \frac{\partial f}{\partial A} f(\theta i) \right) \\ \sum \left( \frac{\partial f}{\partial C} f(\theta i) \right) \end{matrix} \right)$$

As is clear from the relationship shown in FIG. 9B, the obtained constant A corresponds to the misalignment amount Ra. More precisely, a value obtained by multiplying the amplitude A in the image by a resolution of the line sensor 271 when a pixel size is a unit represents the misalignment amount Ra in an actual space. Further, a value (unit: rad) obtained by subtracting ($\pi/2$) from the constant C represents the misalignment direction $\theta$a. If the misalignment amount and the misalignment direction are specified in this way (Steps S408, S409), the misalignment detection process is completed. In the following misalignment correction process (Step S5 of FIG. 4), the horizontal positioning mechanism 23 performs a movement of the chuck mechanism 22 necessary to cancel the obtained misalignment. By correcting the misalignment in this way, the center axis AX4 of the workpiece W and the motor axis of rotation AX3 can be caused to coincide with each other.

As described above, in this embodiment, the workpiece W, e.g. a gear, is rotated and the outer peripheral part is imaged at least for one turn of the workpiece W. From the obtained image, a plurality of regions corresponding in shape to characteristic parts (each characteristic part is one tooth in this example) appearing on the outer peripheral part, congruent to each other and rotationally symmetrical with respect to rotation about the center axis of the workpiece are detected. Specifically, in a two-dimensional image obtained by arraying one-dimensional line images obtained by the line sensor 271 including the outer peripheral part of the workpiece W in the imaging field of view FV in chronological order, the regions corresponding to the reference pattern PT set in advance according to the shapes of the characteristic parts are searched by the pattern matching process.

If there is a misalignment between the mechanical center axis AX4 of the workpiece W and the axis of rotation AX3 in the rotation, the positions (distances from the axis of rotation AX3) of the regions detected by the pattern matching process periodically vary in synchronization with the rotation period. By detecting this variation, the misalignment between the center axis AX4 of the workpiece W and the axis of rotation AX3 can be specified. Specifically, such a periodical variation is approximated by a sine function, and the magnitude of the misalignment (misalignment amount) and the misalignment direction are respectively specified from the amplitude and the phase of the sine function. If the magnitude and the direction of the misalignment are known in this way, the misalignment can be solved by a corresponding correction of relative positions of the members.

The misalignment detection process of this embodiment using the pattern matching process can selectively detect a characteristic part repeatedly appearing a plurality of times, out of various shapes appearing on the outer peripheral part of the workpiece W. Thus, application to workpieces having various outer peripheral shapes is possible by appropriately setting the reference pattern PT used in the pattern matching process. Specifically, the misalignment can be detected by the same process for any of workpieces including teeth T1 having the same shape and arranged at fixed intervals like the workpiece W1 shown in FIG. 6A, workpieces rotationally symmetrical, but including teeth T2 not arranged at fixed intervals like the workpiece W2 shown in FIG. 6B and workpieces not rotationally symmetrical like the workpiece W3 shown in FIG. 6C.

Note that, in each of these workpieces, all the teeth provided on the outer peripheral part have the same shape. Thus, the reference pattern PT corresponding to the shape of one tooth is used. However, a similar misalignment detection can be performed for workpieces including a plurality of differently shaped teeth by appropriately setting the reference pattern PT. An example of such a case is described below.

Figure 12A:
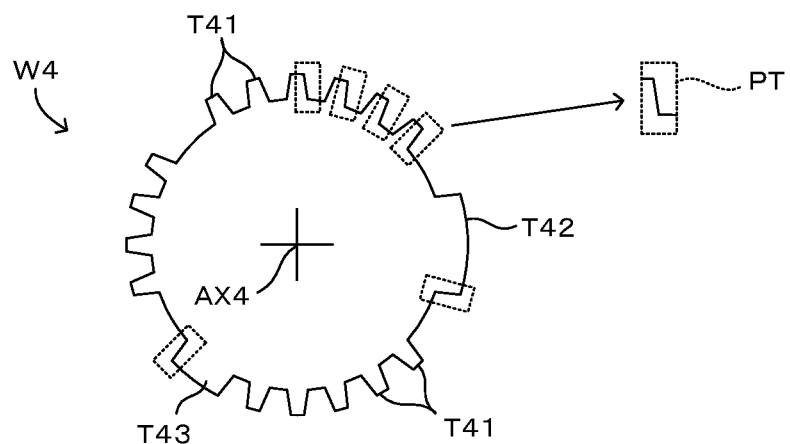
FIGS. 12A and 12B show other examples of workpieces to which the misalignment detection of this embodiment is applied.
Figure 12B:
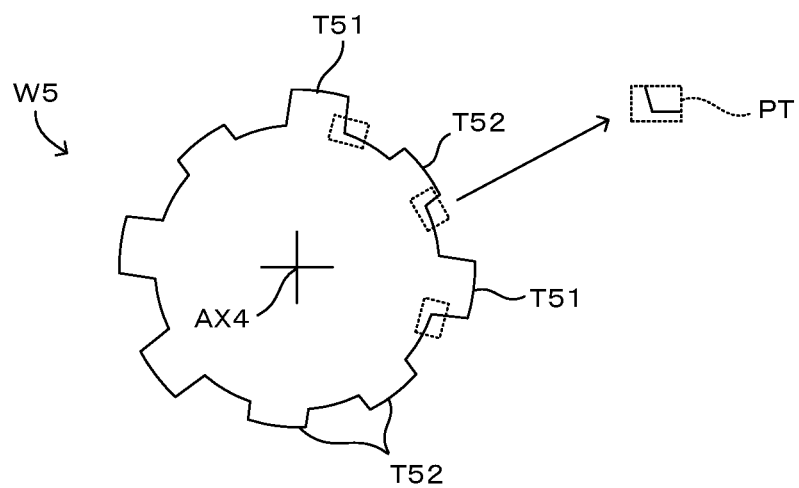

FIGS. 12A and 12B show other examples of workpieces to which the misalignment detection of this embodiment is applicable. In a workpiece W4 illustrated in FIG. 12A, a plurality of types of teeth T41, T42 and T43 having different widths are provided on an outer peripheral part thereof. If a reference pattern corresponding to the shape of any one of the teeth is set in such a workpiece W4, the teeth having the other shapes are not detected in the pattern matching process. If the number of pieces of actual data serving as samples decreases in this way, the accuracy of function approximation is reduced, with the result that the accuracy of the misalignment detection may also be reduced.

In such a case, such a reference pattern PT as to include a shape common to any of the teeth, e.g. a part of a tooth tip, a part of a tooth base and a tooth surface connecting those parts as indicated by a dotted line rectangle in FIG. 12A is set. By doing so, a part corresponding to the reference pattern PT can be detected by the pattern matching process for any one of the teeth T41, T42 and T43 having different tooth widths. The process described above can be applied as it is except the setting of the reference pattern PT. Specifically, the misalignment detection process of this embodiment can be applied also to the workpiece W4 as shown in FIG. 12A.

A workpiece W5 illustrated in FIG. 12B includes teeth T51, T52 mutually different in projecting height from a tooth base and the arrangement of those teeth is not periodic. Also in these teeth T51, T52, the shapes of parts connecting a tooth surface and a tooth base respectively enclosed by dotted line rectangles are congruent to each other and these parts are equidistant from a center axis AX4. By using such parts as characteristic parts and setting the reference pattern PT corresponding to these parts, the misalignment detection process of this embodiment can be applied also to the workpiece W5 shown in FIG. 12B.

Besides, the misalignment detection process of this embodiment can be applied also to workpieces having various outer peripheral shapes such as workpieces having a sawtooth-like outer peripheral part. General rules (conditions) when characteristic parts serving as bases of the reference pattern in such workpieces are extracted include the followings.

(1) Parts have a shape pattern appearing a plurality of times on the outer peripheral part of the workpiece, i.e. are present at a plurality of positions of the outer peripheral part and have shapes congruent to each other.

(2) The parts overlap each other by rotation about the center axis of the workpiece, i.e. are mutually equidistant from the center axis and in a rotationally symmetrical positional relationship with respect to rotation about the center axis.

(3) There are no other parts having the same or similar shape pattern.

Out of these conditions, the condition (3) is introduced to prevent a reduction in the accuracy of function approximation due to the detection of other parts not falling under the conditions (1) and (2), but having a similar shape pattern. However, this condition can be omitted in some cases since it may be possible to omit the influence of such parts, for example, by limiting the search range in the pattern matching process or performing the outlier removing process.

In other words, any member having characteristic parts satisfying these conditions can be a workpiece to be subjected to the misalignment detection process of this embodiment by preparing a reference pattern corresponding to such parts. As just described, in this embodiment, a misalignment detection can be performed for workpieces having various outer peripheral shapes.

As described above, in the above embodiment, the alignment camera 27 functions as an "imager" of the invention. On the other hand, the memory 52 functions as a "storage". Further, the arithmetic processor 51 and the image processor 55 respectively function as a "misalignment detector" and an "image processor" of the invention. A "misalignment detection device" of the invention is constituted by the rotary mechanism 24, the alignment camera 27, the arithmetic processor 51 and the image processor 55.

Note that the invention is not limited to the above embodiment and various changes other than the aforementioned ones can be made without departing from the gist of the invention. For example, although a mechanical component such as a gear is a workpiece in the above embodiment, it does not matter for which use and purpose the workpiece was manufactured. At least any workpiece having such an outer peripheral shape that a radial distance from a center axis to an outer peripheral part repeatedly increases and decreases in a circumferential direction can be applied as a workpiece of the invention.

Further, this embodiment is suitable when a gear including a plurality of teeth not necessarily periodically arranged is a workpiece. However, this embodiment can be, of course, used exclusively to inspect workpieces including teeth provided at fixed intervals, for example, as shown in FIG. 6A. For example, in an inspection for components easily partially chipped due to troubles in manufacturing such as a brittle material, the arrangement of teeth may consequently become non-periodic due to chipping. Also in such cases, the invention can be effectively applied to precisely detect and correct a misalignment.

Further, although the outlier removing process is performed for the result of the pattern matching process in the above embodiment, the misalignment detection process can be performed even if the outlier removing process is omitted. Further, the processing contents of the outlier removing process are also not limited to those described above and another method may be employed. Besides, a filtering process, a binarization process and the like may be combined if necessary.

As the specific embodiment has been illustrated and described above, a misalignment may be detected, for example, based on a variation amount of a radial position between a plurality of detected regions. A misalignment between a center axis and an axis of rotation of a workpiece leads to a variation of a distance from a center of rotation to a workpiece outer peripheral part. Thus, the magnitude of the misalignment can be estimated from the position variation amount in the radial direction.

Further, the imager may include, for example, such a line sensor that a longitudinal direction of an imaging field of view is aligned with the radial direction. According to such a configuration, a one-dimensional line image including the workpiece outer peripheral part is obtained since the imaging field of view of the line sensor includes a part of the workpiece outer peripheral part. When the workpiece rotates, the workpiece outer peripheral part relatively successively passes through the imaging field of view. Therefore, an image of the entire workpiece outer peripheral part can be obtained by successively imaging the workpiece outer peripheral part passing through the imaging field of view by the rotation of the workpiece.

In this case, the pattern matching process may be performed for a two-dimensional image obtained by arraying one-dimensional images obtained by the line sensor in chronological order of imaging. The two-dimensional image generated in this way is an image representing radial position changes of the workpiece outer peripheral part in chronological order. Thus, a position variation of the region detected by the pattern matching process directly indicates a position variation of the workpiece outer peripheral part due to a misalignment. In this way, a degree of misalignment can be accurately obtained.

Further, the misalignment may be obtained, for example, based on an amplitude and a phase angle of a sine function approximating position coordinates of the regions detected in the two-dimensional image. When the workpiece rotates in the presence of a misalignment, the center axis of the workpiece revolves around the axis of rotation. In this way, the position variation of the outer peripheral part due to the variation of the position of the center axis can be expressed by a sine function. In that case, the amplitude represents the magnitude of the misalignment and the phase angle represents the direction of the misalignment. Specifically, the magnitude and direction of the misalignment can be quantitatively obtained from each constant of the sine function obtained by approximation.

Further, a process for removing insignificant positions, out of the positions of the plurality of regions detected by the pattern matching process, may be, for example, further added. The pattern matching process has a problem of erroneous detection due to noise in an image and the presence of parts shaped similarly to the reference pattern. By performing the process for excluding such detection results, an error in quantitatively obtaining the misalignment can be suppressed.

Although the invention has been described by way of the specific embodiments above, this description is not intended to be interpreted in a limited sense. By referring to the description of the invention, various modifications of the disclosed embodiments will become apparent to a person skilled in this art similarly to other embodiments of the invention. Hence, appended claims are thought to include these modifications and embodiments without departing from the true scope of the invention.

INDUSTRIAL APPLICABILITY

This invention is particularly effective when a workpiece to be subjected to a misalignment detection has such an outer peripheral shape that a radial distance from a center axis to an outer peripheral part repeatedly increases and decreases in a circumferential direction. Specifically, even if the workpiece outer peripheral part is not rotationally symmetrical, a misalignment thereof can be accurately obtained.

LIST OF REFERENCE SIGNS

24 rotation mechanism
27 alignment camera (imager)
51 arithmetic processor (misalignment detector)
52 memory (storage)
55 image processor
100 inspection apparatus
271 line sensor
AX3 motor axis of rotation (axis of rotation)
AX4 workpiece center axis (center axis)
PT reference pattern
Ra misalignment amount
W workpiece
θa misalignment direction

The invention claimed is:

1. A misalignment detection device that detects a misalignment of a center axis with respect to an axis of rotation when a workpiece having such an outer peripheral shape that a distance in a radial direction from the center axis to an outer peripheral part repeatedly increases and decreases in a circumferential direction rotates about the axis of rotation, the device comprising:

a storage that stores a reference pattern corresponding to a part of the outer peripheral part;

an imager that images the outer peripheral part at least for one turn of the workpiece by such imaging at a fixed point as to include at least a part of the outer peripheral part in an imaging field of view;

an image processor that detects a region corresponding to the reference pattern by performing a pattern matching process for an image captured by the imager; and a misalignment detector that detects the misalignment based on information on a position of each of a plurality of the detected regions, wherein the reference pattern corresponds in shape to a plurality of characteristic parts that present on the outer peripheral part, have shapes congruent to each other and have a mutually symmetrical positional relationship with respect to rotation about the center axis.

2. The misalignment detection device according to claim 1, wherein the misalignment detector detects the misalignment based on a variation amount of a position in the radial direction between the plurality of detected regions.

3. The misalignment detection device according to claim 1, wherein the imager includes such a line sensor that a longitudinal direction of the imaging field of view is aligned with the radial direction.

4. The misalignment detection device according to claim 3, wherein the image processor performs the pattern matching process for a two-dimensional image obtained by arraying one-dimensional images obtained by the line sensor in chronological order of imaging.

5. The misalignment detection device according to claim 4, wherein the misalignment detector obtains the misalignment based on an amplitude and a phase angle of a sine function approximating position coordinates of the regions in the two-dimensional image.

6. A misalignment detection method that detects a misalignment of a center axis with respect to an axis of rotation when a workpiece having such an outer peripheral shape that a distance in a radial direction from the center axis to an outer peripheral part repeatedly increases and decreases in a circumferential direction rotates about the axis of rotation, the method comprising:

imaging the outer peripheral part at least for one turn of the workpiece by such imaging at a fixed point as to include at least a part of the outer peripheral part in an imaging field of view;

detecting a region corresponding to a reference pattern determined in advance to correspond to a part of the outer peripheral part by performing a pattern matching process for a captured image; and detecting the misalignment based on information on a position of each of a plurality of the detected regions, wherein the reference pattern corresponds in shape to a plurality of characteristic parts that present on the outer peripheral part, have shapes congruent to each other and have a mutually symmetrical positional relationship with respect to rotation about the center axis.

7. The misalignment detection method according to claim 6, wherein the pattern matching process is performed for a two-dimensional image obtained by arraying one-dimensional images obtained by such a line sensor that a longitudinal direction of the imaging field of view is aligned with the radial direction in chronological order of imaging.

8. The misalignment detection method according to claim 6, comprising removing insignificant positions, out of the positions of the plurality of regions detected by the pattern matching process.

* * * * *